(12) United States Patent
Vanderhye et al.

(10) Patent No.: US 7,314,346 B2
(45) Date of Patent: Jan. 1, 2008

(54) THREE BLADED SAVONIUS ROTOR

(76) Inventors: Robert A. Vanderhye, 801 Ridge Dr., McLean, VA (US) 22101-1625; Michael H. Dexter, 7535 Thistledown Trail, Fairfax Station, VA (US) 22039; Aaron L. Aldrich, 697 N. Creek Rd., Little Falls, NY (US) 13365; Brad A. Rotsky, 11 Forsyth Ave., Somerset, MA (US) 02726; Justin R. Hascup, 354 Columbus Ave., Boston, MA (US) 02116

( * ) Notice: Subject to any disclaimer, the term of this patent is extended or adjusted under 35 U.S.C. 154(b) by 148 days.

(21) Appl. No.: 11/265,278

(22) Filed: Nov. 3, 2005

(65) Prior Publication Data

US 2007/0098558 A1    May 3, 2007

(51) Int. Cl.
*F03D 3/06* (2006.01)
(52) U.S. Cl. ............... 415/4.2; 415/907; 416/DIG. 2; 416/DIG. 9
(58) Field of Classification Search ............ 415/2.1, 415/4.1, 4.2, 4.3, 4.4, 4.5, 905, 907; 416/197 A, 416/243, DIG. 2, DIG. 9; 290/55
See application file for complete search history.

(56) References Cited

U.S. PATENT DOCUMENTS

| | | | |
|---|---|---|---|
| 1,697,574 A | | 1/1929 | Savonius |
| 1,768,765 A | | 6/1930 | Savonius |
| 2,677,344 A | | 5/1954 | Annis |
| 4,156,580 A | | 5/1979 | Pohl |
| 4,191,507 A | | 3/1980 | DeBerg |
| 4,274,011 A | | 6/1981 | Garfinkle |
| 4,359,311 A | * | 11/1982 | Benesh .................. 416/197 A |
| 4,362,470 A | * | 12/1982 | Locastro et al. ........ 416/197 A |
| 4,371,346 A | * | 2/1983 | Vidal ........................ 416/121 |
| 4,715,776 A | * | 12/1987 | Benesh ....................... 415/4.1 |
| 4,784,568 A | * | 11/1988 | Benesh ....................... 415/4.2 |

(Continued)

FOREIGN PATENT DOCUMENTS

DE         4016622         11/1991

(Continued)

OTHER PUBLICATIONS

Blackwell et al, "Wind Tunnel Performance Data for Two and Three Bucket Savonius Rotors", Sandia Labs, SAND76-0131, Jul. 1977, pp. 1,3,10-21 & 29-34.

(Continued)

*Primary Examiner*—Igor Kershteyn

(57) ABSTRACT

A Savonius three bladed vertical axis wind turbine rotor has operational characteristics superior to those of conventional three bladed rotors. The blades have high curvature and a high skew factor, for example a curvature of greater than 7:1 (e.g. 2:1-5:1), and a skew factor of greater than 0.6 (e.g. 0.78-0.9). The rotor also includes at least one vertical shaft, the blades operatively connected to the shaft. The rotor typically has an aspect ratio of at least 2:1. The rotor typically has a maximum power coefficient (Cp) of at least twice that of an otherwise identical rotor with a skew factor of 0.5 or less. The rotor can drive a generator with a drive which automatically increases the effective gear ratio as the rotational speed of the rotor increases; or the rotor can be connected to a propeller of a multihull wind powered boat.

21 Claims, 7 Drawing Sheets

U.S. PATENT DOCUMENTS

| | | | |
|---|---|---|---|
| 4,830,570 A * | 5/1989 | Benesh | 415/4.4 |
| 4,838,757 A * | 6/1989 | Benesh | 415/4.4 |
| 5,083,039 A | 1/1992 | Richardson et al. | |
| 5,984,814 A | 11/1999 | Davenport | |
| 6,293,835 B2 | 9/2001 | Garlov | |
| 6,428,275 B1 | 8/2002 | Jaakkola | |
| 6,608,397 B2 | 8/2003 | Makino et al. | |
| 2002/0131864 A1 | 9/2002 | Vos et al. | |
| 2004/0265116 A1 | 12/2004 | Kaneda | |

FOREIGN PATENT DOCUMENTS

| | | |
|---|---|---|
| GB | 244414 | 9/1926 |
| JP | 55069768 | 5/1980 |
| JP | 58187587 | 11/1983 |
| RU | 2101553 | 10/1998 |
| WO | WO2004.113721 A1 | 6/2004 |

OTHER PUBLICATIONS

Khan, "Model and Prototype Performance Characteristics of Savonius Rotor Windmill", Wind Engineering, vol. 2, No. 2, 1978, pp. 75-85.

Boll, "More on The Savonius SuperRotor", Mother Earth News, No. 28, Jul./Aug. 1974.

Saha et al, "Twisted Bamboo Bladed Rotor For Savonius Wind Turbines", 2004.

Rahman, "Torque and Draf Characteristics of a Three Bladed Savonius Rotor", sss.buet.ac.bd/daers/mscthesis/mscme.htm, Sep. 1999, Abstract.

Idan et al, "Continuous Variable Speed Wind Turbine Transmission Concept and Robust Control", Wind Engineering, vol. 24, No. 3, 2000, pp. 151-167.

Johnson, Gary L., Wind Energy Systems, "Methods of Generating Synchronous Power", Nov. 21, 2001, pp. 5-1 thru 5-4.

Gigliobianco et al, "A Self-Trimming . . . Catamaran", AYRS 112, 1993, pp. 29-32.

Rensselaer School of Engineering, "Winding Upward with Corks and Turbines", www.eng.rpi.edu, Sep. 20, 2003.

Turner, Lance, "Making a simple Savonius wind turbine", www.aya.org.au/70byosav.htm, admitted prior art.

Popular Science, Jul. 1933, "New Rotor Ship Sails in Lightest Winds".

Hayashi et al, "Wind Tunnel Tests on a Three-stage Out-phase Savonius Rotor", 2004.

Environmental Building News, vol. 13, No. 4, Apr. 2004, "Solar- and Wind-Powered Outdoor Lighting from MoonCell".

LandRider Owner's Manual, Version 7, 2002, pp. 13-20.

"Our Wind Turbine", www.windausenergy.com, 2004.

WS-models, 2002, www.windside.com.

Usiyama et al; Optimum Design Configuration and Performance of Savonius Rotors; "Wind Engineering", vol. 12, No. 1, 1988, pp. 59-75.

Moutsoglou et al; Performance Tests of a Benesh Wind Turbine Rotor; "Wind Engineering", vol. 19, 1995, pp. 349-362.

\* cited by examiner

THREE BLADED SAVONIUS ROTOR

CROSS REFERENCE TO RELATED APPLICATION

This application relates generally to the technology in application Ser. No. 11/113,176 filed Apr. 25, 2005, and specifically claims some of the features disclosed but not claimed therein. The disclosure of Ser. No. 11/113,176 is hereby incorporated by reference herein.

BACKGROUND AND SUMMARY OF THE INVENTION

The invention relates to a particular construction of Savonius rotor blade, a particular Savonius vertical axis wind turbine rotor, and a watercraft using a particular Savonius vertical axis wind turbine to power a propulsion device (such as a substantially horizontal axis propeller). The Savonius rotor blade, and rotor, according to the present invention have numerous advantages over prior art Savonius blades and rotors. In particular, because of the unique construction of the blades according to the present invention, a three bladed Savonius rotor is provided which can be expected to operate much more smoothly and effectively than conventional two bladed Savonius rotors, and with a higher maximum power coefficient (Cp) than known three bladed Savonius rotors.

In the following specification and claims the following terms have the indicated meanings:

"Cp" or "maximum power coefficient" means (as it normally does): Turbine torque times turbine rotational speed divided by freestream dynamic pressure times freestream velocity times the turbine swept area; or proportional to maximum power divided by swept area [that is $Cp=P/[½ A \rho v^3]$ where P=power, A=swept area, $\rho$=the density of air (about 1.2 kg/m$^3$ at sea level and 70 degrees F.), and v=wind velocity].

"Tip Speed Ratio" or "TSR" means (as it normally does): blade tip speed divided by wind speed. For drag wind turbines this ratio is always less than one.

"Curvature" of a blade means: The ratio of the radius of the blade to the depth. The smaller the ratio, the more pronounced the curvature.

"Skew factor" of a blade means: The maximum curvature depth location along the radius of a blade from the axis of rotation. The larger the skew factor, the closer the maximum curvature depth is to the free end of the blade.

"Aspect ratio" means (as it normally does): The ratio of the length (height) of a rotor (or blade) to its diameter.

"Effective gear ratio" means: The rpm ratio between a driving and a driven component, whether gears or some other mechanical structure (such as chains and sprockets, pulleys and belts, cones and belts, etc.) are used to provide the operative connection between the driving and driven components.

"Operatively" or "operative" means (as it normally does): Any connection or engagement that allows the components connected or engaged to function as designed.

Although from the time of filing his first patent application in 1924 (see canceled FIG. 6 of GB published specification 244,414) Sigurd Savonius—the inventor of the Savonius rotor—contemplated a three bladed version as well as two bladed versions, more than eighty years later there are few [e. g. see *Environmental Building News*, Vol. 13, #4, April, 2004, p. 7, "Solar and Wind-Powered Outdoor Lighting from MoonCell"] commercial versions of the three bladed version. Perhaps because extensive wind tunnel testing by Sandia Laboratories in 1977 [Blackwell et al, "*Wind Tunnel Performance Data For Two And Three-Bucket Savonius Rotors*", SAND76-0131, July, 1977] concluded "The maximum power coefficient of the two-bucket configuration is approximately 1.5 times that for the three-bucket configuration", there has been almost no attempt to optimize a three bladed Savonius rotor. Conversely, there has been a great deal of work done on optimizing two bladed configurations [for example see Khan, "*Model And Prototype Performance Characteristics Of Savonius Rotor Windmill*", Wind Engineering, Vol. 2, No. 2, 1978, pp. 75-85].

It has been found according to the present invention, however, that if a three bladed configuration of a Savonius rotor is optimized, the three bladed version can have advantages over and at least be competitive with two bladed versions. In addition to operating more smoothly, it can be just as easy or easier to manufacture; can have a Cp as great as, or greater than, two bladed versions with the same aspect ratio; and self-starts more easily. A critical factor in the optimization of a three bladed Savonius rotor is the skew factor, something not even recognized as a result-effective variable for three bladed Savonius rotors in the prior art. It has been found that a high skew factor (e. g. at least about 0.6, preferably over about 0.7, and most preferably about 0.75-0.85), along with significant curvature, results in a rotor with a Cp about 2-5 times greater than those with similar curvatures but lower skew factors, e. g. 0.25 or 0.5 (about 0.5 being the common skew factor for three bladed Savonius rotors).

According to one aspect of the present invention there is provided a Savonius vertical axis wind turbine ("VAWT") rotor comprising: three blades operatively connected together to define a vertical axis wind turbine rotor; the blades having a curvature of greater than about 7:1, and a skew factor of greater than about 0.6. The rotor preferably also comprises at least one substantially vertical shaft, with the blades operatively connected to the shaft. The rotor preferably has an aspect ratio of at least about 0.8:1, more preferably at least about 2:1 (e. g about 3:1) Also, preferably the blades have a skew factor of about 0.7-0.9, e. g. about 0.75-0.85 or about 0.75-0.8, and a curvature of about 2:1 to 5.5:1, e. g. about 2.5:1 to 5:1. Such a rotor may be expected to have a Cp significantly greater than otherwise similar rotors with lower skew factors. That is the Cp of a rotor according to the invention can be expected to be at least about twice that of an otherwise identical rotor with a skew factor of 0.5 or below Instead of the conventional construction of a Savonius rotor, which includes at least top and bottom discs to which vanes are attached to form the blades, typically with no central shaft between the discs, preferably the blades of the rotor according to the invention comprise a plurality of substantially vertically aligned spokes axially spaced along the at least one shaft, each spoke comprising three generally radially extending ribs; and vanes of sheet material operatively connected to the ribs. Preferably the vanes are substantially straight vertically, substantially devoid of twist, although in some circumstances a slight twist can be provided. While a wide variety of materials may be used to construct the Savonius rotor, preferably the ribs are made of substantially rigid (e. g. plates or bars) aluminum, titanium, carbon fiber, pvc, or steel alloy, and the vanes are made of sheet material of aluminum, titanium, carbon fiber, steel alloy, Pentex (modified low stretch polyester), polycarbonate (e. g. Lexan®), or other plastic having substantially the same strength, structural integrity, and durability properties as polycarbonate.

While plural shaft versions of the Savonius rotor according to the invention—such as shown in co-pending application Ser. No. 10/854,280 filed May 27, 2004 (the disclosure of which is hereby incorporated by reference herein)—and other versions with spillover are within the scope of the invention, multiple shafts and significant spillover are not necessary to achieve a high Cp when practicing the invention. That is, the Savonius rotor according to the invention may comprise a single shaft, with each spoke comprising a hub surrounding the shaft and operatively connected thereto to substantially preclude movement with respect to the shaft, the ribs extending generally radially outwardly from the hub.

The Savonius rotor of the invention may be used to power a boat (e. g. by driving a propeller), such as disclosed in co-pending application Ser. No. 10/443,954 filed May 23, 2003, power a generator to generate electricity (as disclosed in U.S. Pat. No. 6,172,429), power a pump to pump water or other liquids, or be used in combination with virtually any other conventional driven element. According to another aspect of the invention, the Savonius rotor is in combination with a driven element and a drive operatively connects the driven element to the rotor; the drive automatically increasing the effective gear ratio directly in response to an increase in the speed of rotation of the rotor. As one example, the drive may comprise a first sprocket operatively connected to the at least one shaft, and different size smaller at least second and third sprockets operatively connected to the driven element with a chain operatively connecting the first sprocket and one of the at least second or third sprockets; and a transmission comprising a centrifugal force responsive derailleur for automatically shifting the chain between the second and third sprockets. In this way as the speed of rotation of the rotor increases, so too does the rpm of the driven element so that start-up of the rotor is not hindered yet a high rpm of the driven element may be obtained.

According to another aspect of the present invention, a blade per se for a Savonius turbine rotor is provided. The blade comprises a plurality of substantially rigid ribs spaced from each other along a first axis and substantially in alignment with each other along that axis; and a vane of sheet material extending between the ribs and operatively connected thereto. The blade has a curvature of greater than about 7:1, and a skew factor of greater than about 0.7, e. g. a skew factor of about 0.75-0.85 and a curvature of about 2:1 to 5.5:1. Preferably the blade also has an aspect ratio of at least about 4:1 (about twice the skew factor of a rotor constructed therefrom).

According to yet another aspect of the present invention there is provided a wind powered boat comprising: a plurality of hulls (e. g. the boat is a catamaran or trimaran); a propulsion mechanism (such as a substantially horizontal axis propeller) operatively connected to at least one of the hulls and between two of the hulls; and a Savonius vertical axis wind turbine rotor having an aspect ratio of at least about 2:1, and comprising: at least one substantially vertical shaft; three blades operatively connected to the shaft; and the blades having a curvature of greater than about 6:1 (e. g. about 2:1 to 5:1), and a skew factor of greater than about 0.65 (and preferably about 0.75 or greater). The rotor is operatively mounted to at least one of the hulls and operatively connected to the propulsion mechanism.

It is the primary object of the present invention to provide an effective Savonius rotor having a wide variety of uses and used in a wide variety of manners while operating smoothly with a high Cp. This and other objects of the invention will become clear from a detailed description of the invention, and from the appended claims.

DETAILED DESCRIPTION OF THE DRAWINGS

Figure 1:
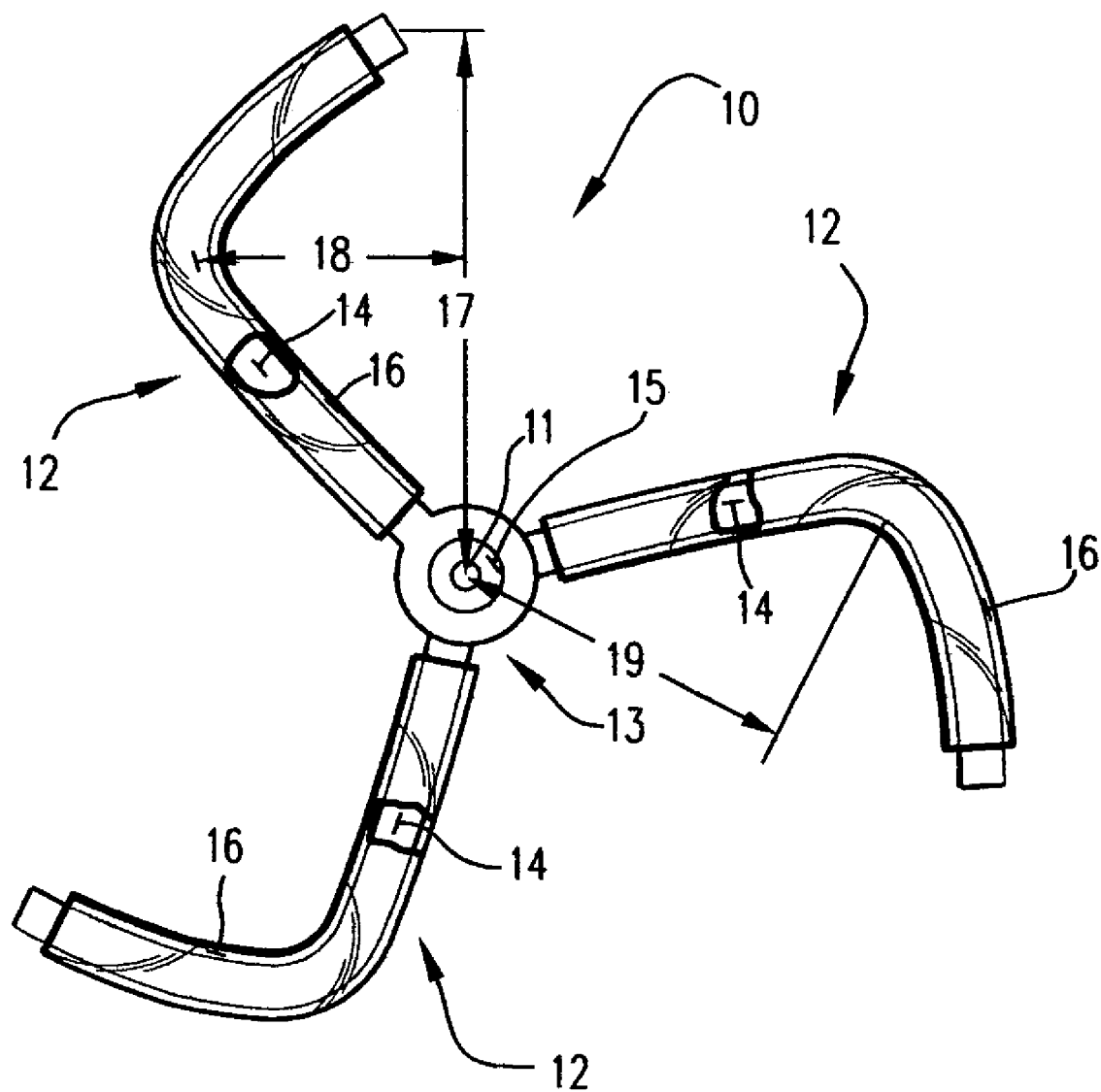
FIG. 1 is top plan view of a first Savonius rotor according to the present invention.
Figure 5:
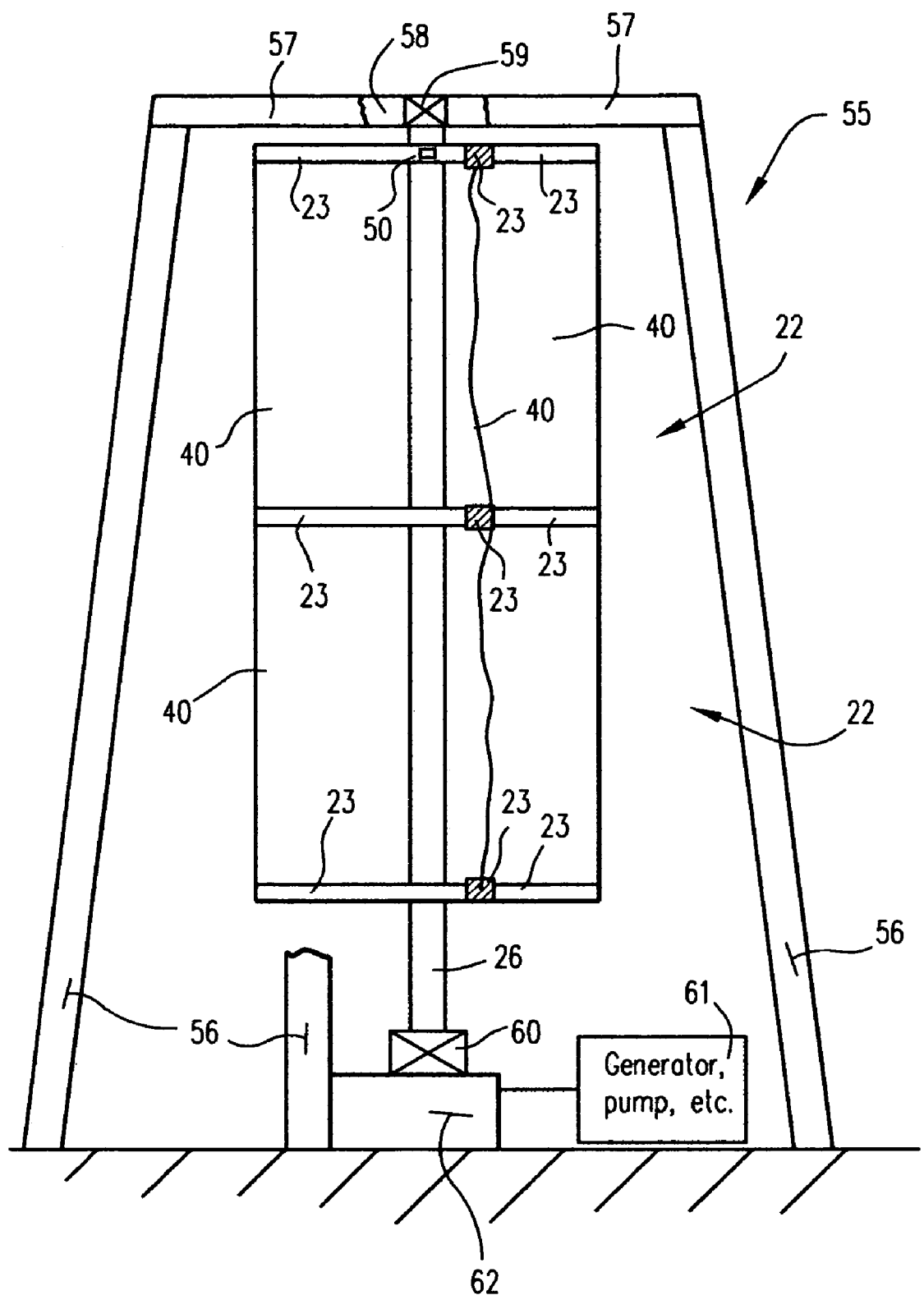
FIG. 5 is a side elevational view, with one set of ribs and associated vane cut away for clarity of illustration, of a Savonius rotor according to the present invention constructed according to FIGS. 3A & 4 in combination with a driven element according to the present invention.

FIG. 1 schematically illustrates, generally by reference numeral 10, an exemplary Savonius rotor for a VAWT according to the present invention. While the rotor 10 may be constructed using top and bottom discs as is common for Savonius rotors, preferably the rotor 10 includes a shaft 11, and three blades 12. While a single shaft 11 is preferred, a double shaft, or multiple shaft, embodiments may also be provided, as in U.S. patent application Ser. No. 10/854,280 filed May 27, 2004. Since it is the configuration of the blades 12 that is a major feature of the present invention, FIG. 1 shows a top plan view because that most clearly illustrates the blade configuration. However, it is understood that the rotor 10 will have the same basic construction as illustrated in FIG. 5.

In the embodiment of FIG. 1, the blades 12 are formed by a plurality of spokes 13 that are axially spaced along the shaft 11, only one spoke 13 visible in FIG. 1 since it is a top plan view. Each spoke 13 comprises three generally radially extending ribs 14 having a desired curvature and skew factor according to the present invention. In the FIG. 1 embodiment, the ribs extend outwardly from a central hub 15, which surrounds the shaft 11 and is operatively connected thereto (such as ultrasonically welded thereto, secured by mechanical fasteners, connected in the manners disclosed in co-pending application Ser. No. 11/113,176, or otherwise operatively connected thereto). The blades 12 further comprise vanes 16 which are shown as transparent material in FIG. 1, and extend substantially vertically between axially spaced, substantially vertically aligned, ribs 14.

The vanes 16 may be of any sheet material suitable for use in a Savonius wind turbine, including modern engineered sail cloth such as Pentex. In FIG. 1, for clarity of illustration, the vanes 16 are shown made of transparent flexible material, such as Pentex, wrapped around the ribs 14 and the free ends thereof stitched or otherwise affixed to the main body of the vanes 16 to hold them taut and in operative position. However it is preferred that the vanes 16 are of relatively rigid sheet material (though the sheets themselves are flexible). That is, the vanes 16 may be aluminum, titanium, carbon fiber or other composite material, polycarbonate (transparent or opaque, transparent being particularly appropriate when the rotor 12 drives a boat propeller), or other suitable material having characteristics (particularly strength, weight, and manufacturability) comparable (including superior) to polycarbonate or aluminum. For example the vanes 16 may be of the materials specified in co-pending application Ser. No. 11/113,176.

A major purpose of the illustration in FIG. 1 is to show the curvature and skew factor of the blades 12 according to one embodiment of the invention. The radius of each blade 12/rib 14 is the distance 17 from the center of the shaft 11 to the outer tip of rib 14. The depth of each blade 12/rib 14 is the maximum depth 18 thereof. The curvature of the blade 12 is the ratio of the radius 17 to the depth 18. In the FIG. 1 embodiment, the curvature is about 2.5:1. The skew factor is the location 19 at which the maximum depth 18 is located along the radius 17. In the FIG. 1 embodiment the skew factor 19 is about ¾, or about 0.75, that is the maximum depth 18 is located at about ¾ of the distance (the radius 17) from the center of shaft 11 to the tip of rib 14.

Figure 2:
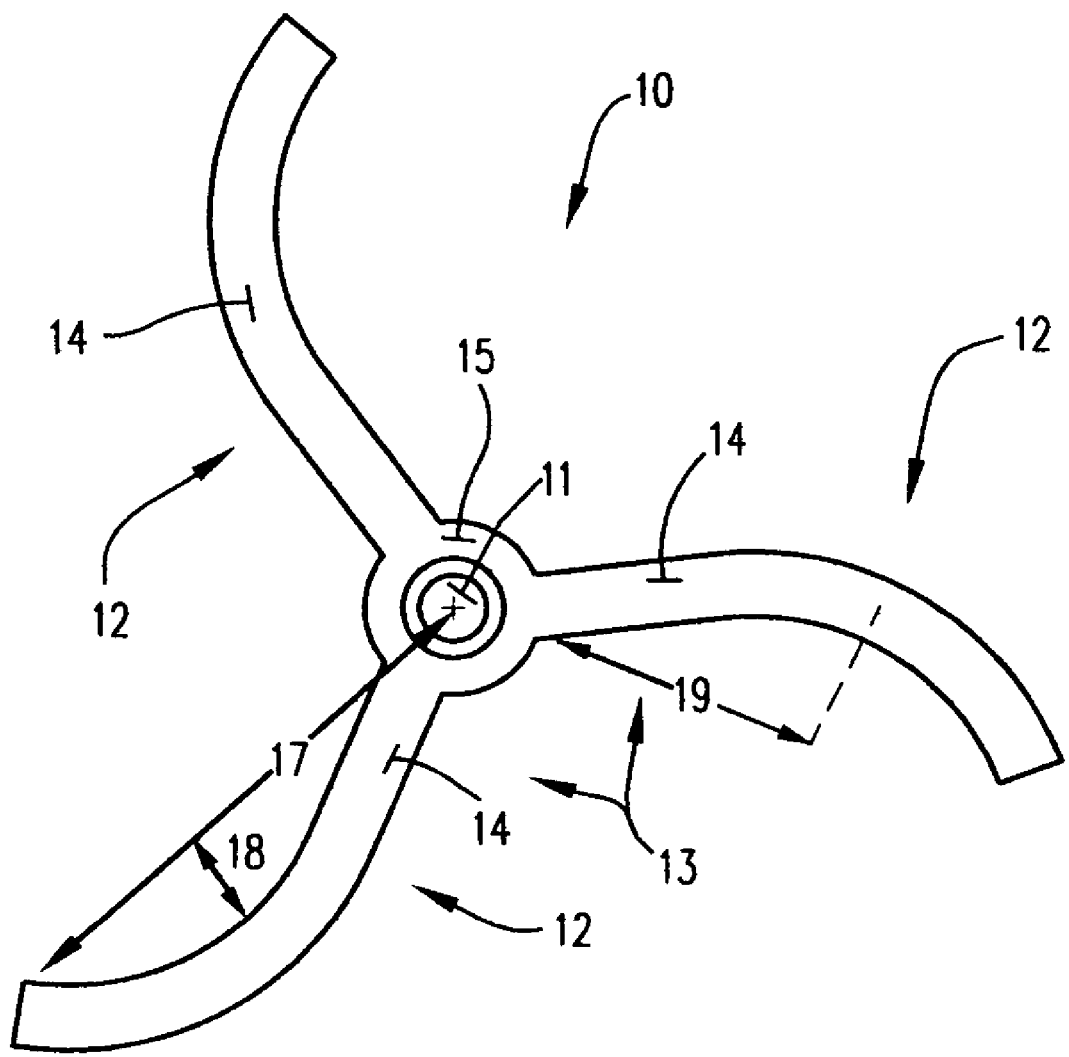
FIG. 2 is top plan view of a spoke and shaft of a second Savonius rotor according to the present invention.

FIG. 2 is another exemplary embodiment according to the present invention. In this embodiment, for clarity of illustration, the vane material 16 is not shown, only the spoke and shaft. The reference numerals in FIG. 2 correspond to comparable structures in FIG. 1. As in the FIG. 1 embodiment, in the FIG. 2 embodiment the centers of the blades 12 are arcuately spaced substantially uniformly from each other around the shaft 11, e. g. about 120 degrees.

In the FIG. 2 embodiment, the curvature is about 5:1, and the skew factor 19 is about 0.75. The radius 17 is less than in the FIG. 1 embodiment, meaning that for a particular length (height) of rotor 10 the aspect ratio of the FIG. 2 embodiment will be greater than for the FIG. 1 embodiment.

In actual testing of rotors constructed substantially according to the FIGS. 1 and 2 embodiments, using a plurality of aligned spokes 13 spaced along the axis defined by shaft 11, with an aspect ratio of the FIG. 1 embodiment of about 0.85 to 1 and an aspect ratio of the FIG. 2 embodiment of about 1.2:1, both the rotors 12 of FIGS. 1 & 2 had a Cp of about 0.04 for the particular test conditions. This compared (for substantially identical testing conditions) to a Cp of about 0.008 for a rotor having a curvature of about 2.5:1 but a skew factor of about 0.25 and an aspect ratio of about 0.67; a Cp of about 0.022 for a rotor having a curvature of about 2.5:1 but a skew factor of about 0.5 and an aspect ratio of about 1.2:1; and a Cp of about 0.019 for a rotor with a curvature of about 5:1 but with a skew factor of about 0.25 and an aspect ratio of about 0.85:1. The Cp of the FIG. 1 embodiment would very likely have been greater than that of the FIG. 2 embodiment if the aspect ratios had been the same. This is because for two bladed Savonius rotors generally Cp increases as aspect ratio increases, at least up to an aspect ratio of about 3:1 (see *Mother Earth News*, Issue No. 28, July/August 1974 "More on The Savonius Super Rotor" by John Boll).

Thus it can be concluded that a high skew factor with high curvature is particularly desirable for the blades 12 of a three bladed Savonius, according to the invention. That is, the Cp of a rotor according to the invention can be expected to be at least about twice that of an otherwise identical rotor with a skew factor of 0.5 or below As with essentially all wind turbine rotors, the Cps of the rotors of the invention are at their maximum within a certain range of TSR, although the TSR range may vary widely from one type of rotor to another. For example, the rotors of both FIGS. 1 & 2 will have their maximum Cps when the TSR is between about 0.2 and 0.45, gradually ramping up from a TSR of 0, and gradually ramping down form a TSR of about 0.45.

The invention also encompasses a blade 12 per se of the rotors, such as rotor 10, according to the invention. Since each blade has a width (radial dimension when part of a rotor) one half the diameter of the rotor, its aspect ratio is twice that of the rotor with which it is associated. That is if the aspect ratio of the rotor is at least about 2:1, the aspect ratio of each of the three blades associated therewith is at least about 4:1.

According to the invention, blades 12 having a curvature of greater than about 7:1 (preferably about 2:1 to 5.5:1) and a skew factor of greater than about 0.6 (preferably about 0.7 or greater, e. g. of about 0.75-0.9), are preferred. Also, it is preferred that the aspect ratio of the rotor 10 be at least about 0.8:1, preferably at least about 2:1, e. g. about 3:1.

Figure 3A:
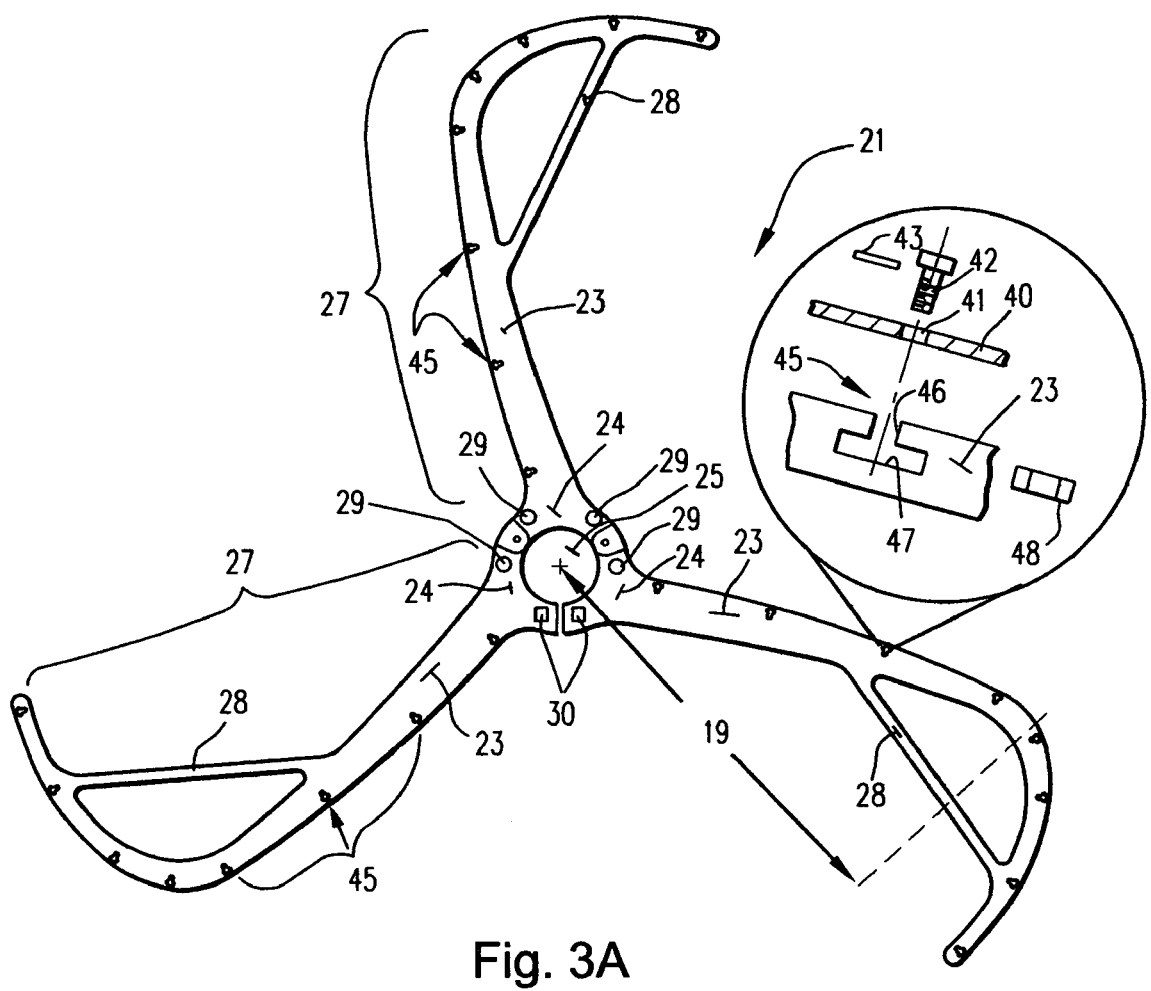
FIG. 3A is top plan view of an exemplary spoke for a third Savonius rotor according to the present invention.

FIG. 3A is a top plan view of one spoke 21 of another exemplary rotor 22 (see FIG. 5) according to the present invention. The spoke 21 has a configuration similar to that of the spokes in FIGS. 4 & 5 of Ser. No. 11/113,176 only is specifically adapted for a particularly desirable three bladed Savonius rotor 22 (FIGS. 4 & 5).

In the FIG. 3A embodiment, for ease of manufacture, the spoke 21 is constructed in three major pieces 27 which may be identical, or almost identical (that is, substantially identical), and in use arcuately spaced about 120 degrees from each other. [Alternatively, but less desirably, the entire spoke 21 can be formed in one piece.] Each piece 27 includes a rib 23 and a hub segment 24. The hub segments 24 when aligned and substantially abutting—as in FIG. 3A—define a complete hub, which in turn defines an open center area 25. In the preferred embodiment illustrated, the open center area 25 is substantially circular having substantially the same diameter as a single shaft (26 in FIG. 4) which it receives and is operatively connected (e. g. clamped) to. The skew factor 19 of the ribs 23 is about 0.78, and the curvature is about 2.6:1, and the aspect ratio of the rotor 22 of FIG. 5 made therefrom is about 2.67:1. The individual pieces 27 may be laser, water jet, or otherwise cut from sheets or plates of steel, aluminum (e. g. about ¼ to ½ inch thick), titanium, carbon fiber, or the like, or may be molded, or otherwise formed. Because of the high curvature and skew factor of the ribs 23, preferably a supporting element 28 is also integrally formed as part of each piece 27. The element 28, which preferably is a strut or bar as illustrated, extends between a central portion of the rib 23 and a portion adjacent the free end of the rib 23 spaced from the hub segment 24. The strut or bar 28 increases the strength of the rib 23 while minimizing the amount of material of the piece 27.

To facilitate clamping connection of the spoke 21 formed by the three pieces 27 to a shaft 26 (FIG. 4), openings 29, 30 are formed in the hub segments 24 during cutting, molding, or other formation thereof, or drilled or punched after formation. While two different shapes/configurations of openings 29, 30 are illustrated, other components may be designed and utilized which allow openings of only one configuration.

Figure 4:
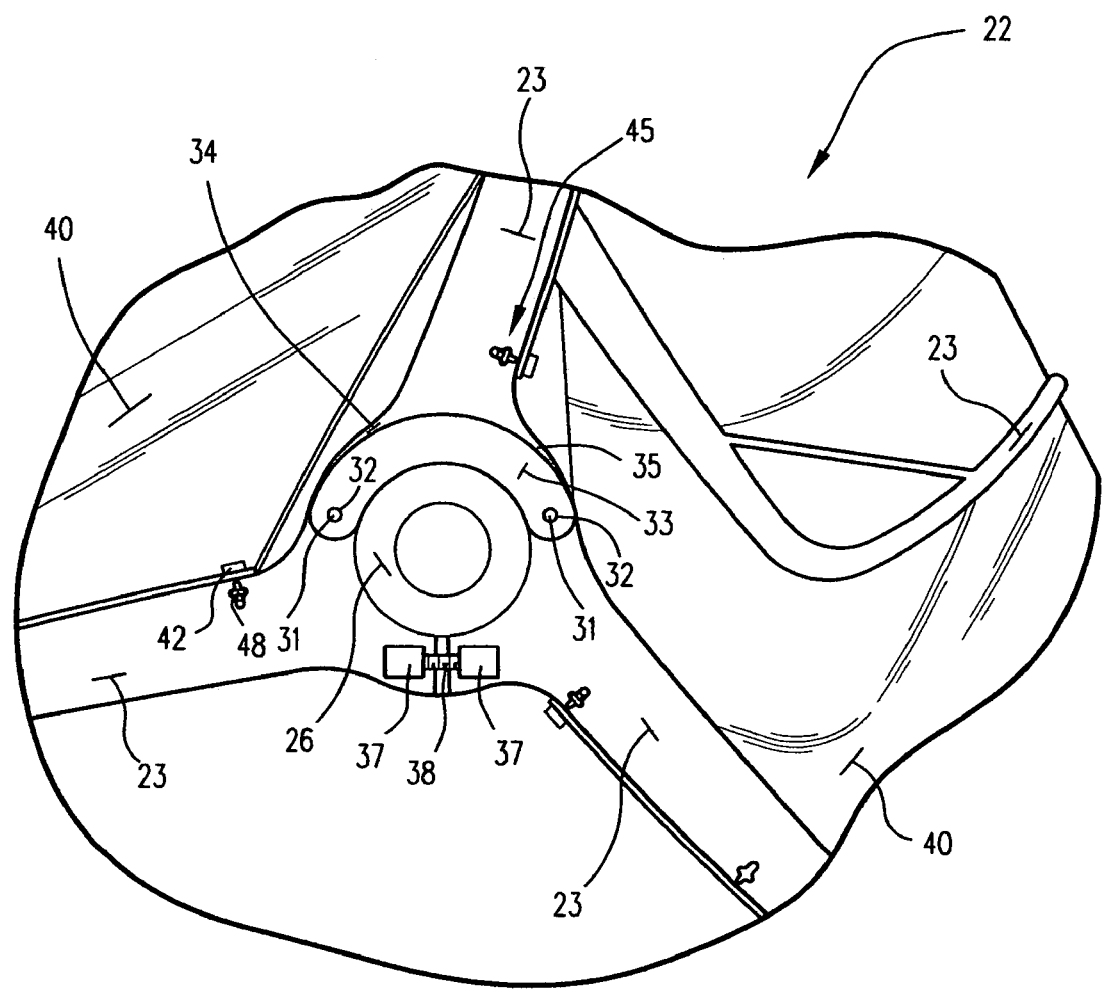
FIG. 4 is a detail perspective view of the spoke of FIG. 3B shown connected to a shaft and vanes to define a Savonius rotor.

The openings 29 may receive pins—such as steel or aluminum pins 31 in FIG. 4—therein. The pins 31 are force or friction fit in aligned openings 32 of one or more bridging pieces 33 (FIG. 4) preferably formed of the same material as the spoke 21. While the bridging piece 33 is shown connecting only the right and left pieces 27 of the spoke 21 of FIG. 3A, other holes and pins can be associated therewith to connect to the central piece 27 of the spoke 21. Alternatively, two other smaller bridging pieces 34, 35 barely visible in dotted line in FIG. 4, with associated openings and pins (not shown) connect the leftmost piece 27 of spoke 21 to the center piece 27, and the rightmost piece 27 to the center piece 27, respectively. Other fasteners besides pins 31 may be utilized, and other connecting structures besides the bridges 33-35 and openings 29 shown.

In order to clamp the spoke 21 to the shaft 26, fastener receiving elements (e. g. nuts) 37 are provided in the openings 30, like in the FIG. 4 embodiment of co-pending application Ser. No. 11/113,176. The nuts 37 are internally threaded and welded, force fit, or otherwise securely inserted in the openings 30 or otherwise attached to the right and left pieces 27 of the spoke 21 of FIG. 3A. An externally threaded fastener 38 connects the nuts 37 to each other, and when tightened moves the nuts 37 toward each other to clamp the spoke 21 to the shaft 26. Other conventional mechanical clamping components may be used instead of the nuts 37 and threaded fastener 38.

The spokes 21 are preferably aligned and axially spaced along shaft 26 (see FIGS. 4 & 5), and are operatively connected to vanes 40, preferably in the same manner as in co-pending application Ser. No. 11/113,176. That is, at spaced locations along each vane 40 where it will cooperate with a rib 23 of a spoke 21 are a plurality of openings 41, designed to receive mechanical fasteners (for example bolts 42, possibly with washers 43 between the bolt heads and vane 40).

Cut or otherwise formed into the spokes 21, particularly the ribs 23 thereof, are generally T-shaped channels 45, having a stem portion 46 for receipt of a bolt 42 shaft, and a cross portion 47 for receipt of a nut 48. This is most clearly seen in the enlarged segment of the rightmost rib in FIG. 3A. While first and second fasteners in the form of bolts 42 and nuts 48 are preferred, other conventional or hereafter developed fasteners may alternatively, or in addition, be provided. While the channels 45 may be provided in the inner (convex) surfaces of the ribs 23, preferably—as seen FIGS. 3 & 4—they are provided in the outer (concave) surfaces of the ribs 23.

Figure 3B:
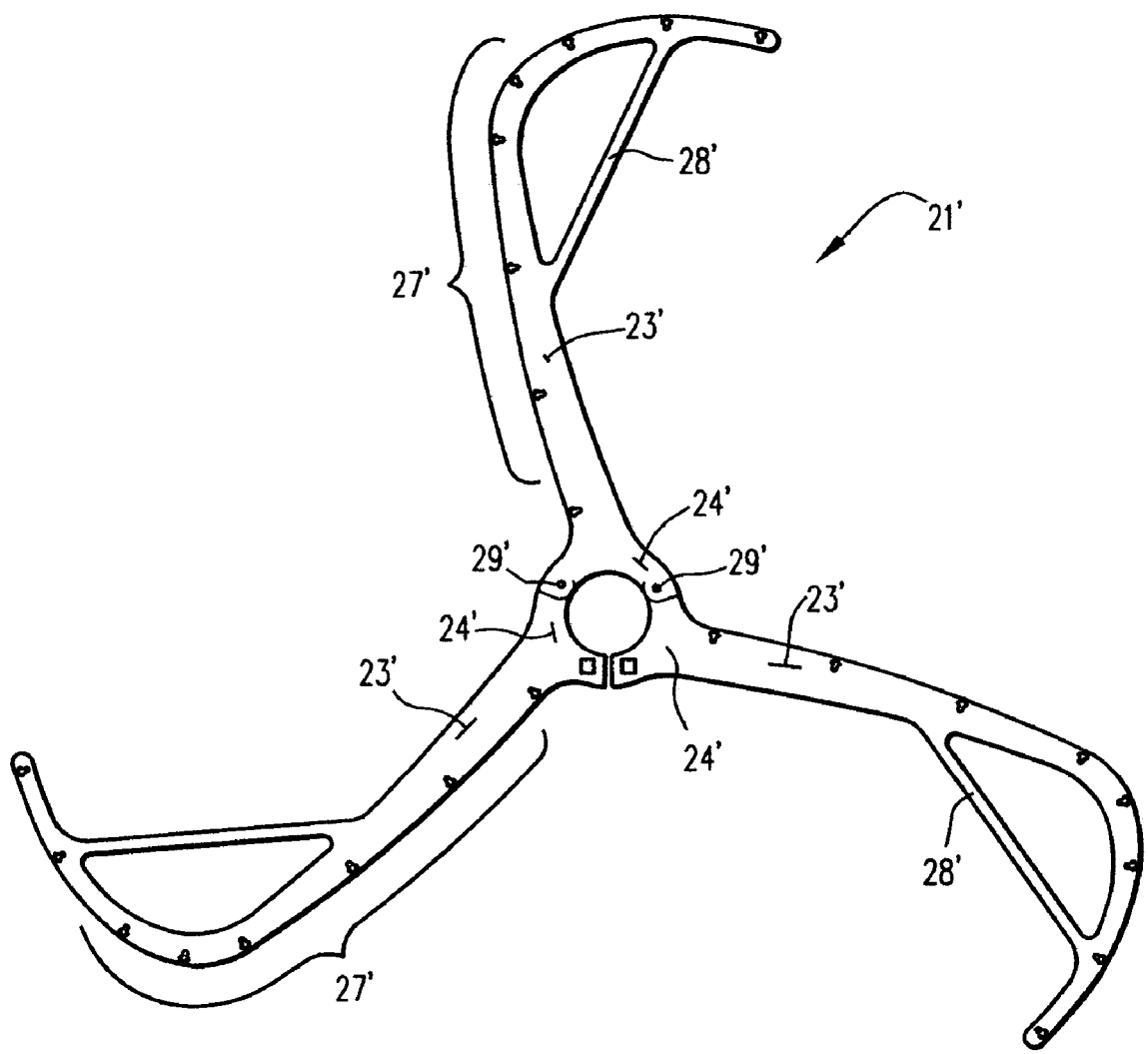
FIG. 3B is a top plan view of a minor modification of the spoke of FIG. 3A.

FIG. 3B shows a spoke 21' which is a minor modification of the FIG. 3A embodiment (like components are shown by the same reference numeral only followed by a prime). In the FIG. 3B embodiment, the hub segments 24' are constructed so that the central opening 25' has the correct dimensions when the openings 29' in the center piece 27' are aligned with the openings 29' in the right and left pieces 27'. Thus the pins 31—see FIG. 4—pass through the aligned openings 29', and through the openings 32 in a single bridge piece 33, to hold all three pieces 27' together, e. g. for pivotal movement with respect to each other. When it is desired to clamp the spoke 21' to a shaft 26, the same mechanism as seen in FIG. 4 moves the left and right pieces 27' toward each other, and clamps spoke 21' to shaft 26.

The construction of FIGS. 3A, 3B, & 4 is highly desirable since it allows the vanes 40 to be securely held to the spokes 21, without likely high fatigue points, yet the connections may be made easily and inexpensively, and the construction easily assembled (and disassembled if desired) by unskilled labor. For example, the holes 41 and channels 45 may be punched, or laser or water-jet cut, and no drilling or tapping is necessary (although it may be provided in some circumstances).

In use of the spokes 21, 21' of FIGS. 3A and 3B, an end of shaft 26 is placed in opening 25, 25' and the spoke 21, 21' is slid along the shaft 26 to the desired "vertical" (during ultimate use as a VAWT) location. There, the bolt 38 is passed into operative association with the elements 37, drawing elements 37 toward each other and narrowing or closing the slot between the right and left pieces 27, 27'. This causes the interior surface of the hub defined by hub segments 24, 24' defining the opening 25, 25' to tightly engage the shaft 26 so there is no slippage therebetween. Typically the vanes 40 are affixed to the spokes 21, 21' after the spokes are placed in the desired position along shaft 26.

In all of the FIGS. 1-5 embodiments, flow directors may be provided at the top and bottom of the rotor, as illustrated in spending application Ser. No. 11/113,176.

If the vanes 40, or at least the upper portions thereof, are made of flexible, collapsible, material, such as sail cloth, a conventional solenoid controlled clamp—shown schematically at 50 in FIG. 5—may be used instead of the elements 37, 38. The clamp 50 may be responsive to a radio (or other remote) signal from an operator. Alternatively the clamp 50 may be a conventional quick release clamp that may be readily released manually by an operator.

FIG. 5 shows one embodiment of a rotor 22 according to the invention mounted in a metal (e. g. steel) tower 55. The tower 55 has three supporting legs 56 and three top cross pieces 57 connected to a central hub 58. However any number (e. g. four or more) of legs 56 may be provided. The central hub 58 mounts a conventional bearing 59 for the shaft 26.

At the base of the tower 55 is a bearing assembly 60 which mounts the bottom of the shaft 26. The bearing assembly 60 may comprise both a thrust bearing and a load bearing. The rotor 22 drives a driven element, shown schematically at 61 in FIG. 5, such as an electrical generator or alternator, pump, or any other element which can be driven by a wind turbine. A drive—shown schematically at 62 in FIG. 5—operatively connects the shaft 26 and driven element 61.

Figure 6:
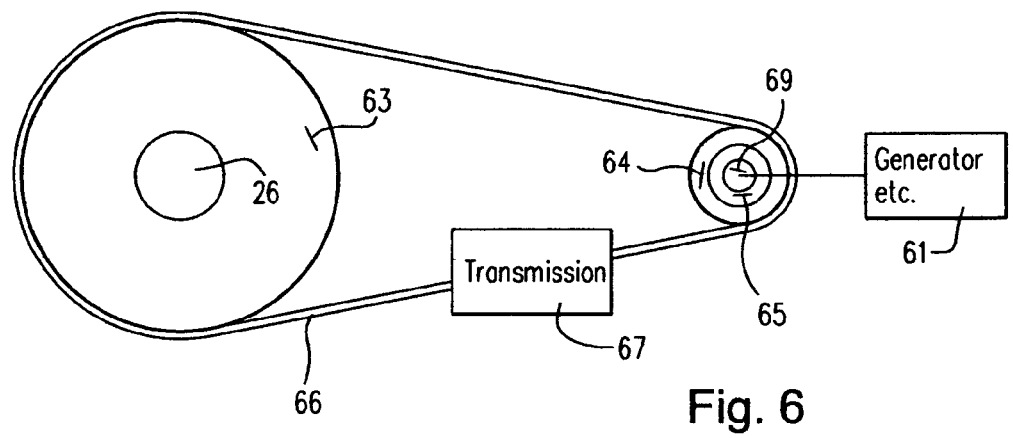
FIG. 6 is a detailed schematic view of the sprocket, chain, and transmission components of one exemplary form of the drive of the rotor of FIG. 5.

The drive 62—shown in more detail in the schematic, exemplary, illustration in FIG. 6—operatively connects the rotor 22 to the driven element 61 so as to automatically increase the effective gear ratio between 26 and 61 as the speed of rotation of the rotor 22 increases. One exemplary way this is accomplished is illustrated in FIG. 6.

In FIG. 6, the drive 62 comprises a first, large, sprocket 63 connected to the shaft 26 for rotation therewith, and at least second and third smaller sprockets, 64, 65, respectively, operatively connected to a driven element 61, such as a generator. A chain 66 connects sprocket 63 to one of sprockets 64, 65. A transmission 67—shown only schematically in FIG. 6—is provided to automatically shift the chain from the larger 64 of the small sprockets to the smaller 65 thereof when the speed of rotation of the sprocket 63 (or shaft 26 connected thereto) substantially reaches a predetermined level.

In one exemplary form, the transmission 67 comprises a centrifugal force derailleur which automatically shifts the chain 66 between sprockets 64, 65. Such a derailleur is commercially available under the trade designation "Auto Shift" in LandRider™ bicycles from Venture Cycle, LLC, Lutherville, Md. Since the "Auto Shift" derailleur automatically senses the speed of the chain 66—which of course is directly related to the speed of the sprocket 63 and shaft 26, and which is in turn directly related to the average speed of the wind acting on rotor 22—no separate sensor is necessary. The "Auto Shift" derailleur also operates both ways, so that it downshifts back to sprocket 65 once the chain 66 speed falls below the predetermined level.

In the embodiment illustrated in FIG. 6, the effective gear ratio of the sprockets and the rotor speed at which the transmission 67 will shift will depend upon the size of the rotor 22, the size of the sprockets 63-65, the exact type of generator or other driven element 61 used, and other factors. In one example, especially suitable when the unit 61 is a generator or alternator, the effective gear ratio provided by the sprockets 63, 64 is about 7:1, and the ratio provided by sprockets 63, 65 is 10:1 or higher. If the rotor 22 reaches 50 rpm at a wind speed of about 5 mph, then the transmission 67 is designed to shift the chain 66 from sprocket 64 to sprocket 65 when it directly senses that the chain 66 reaches a speed comparable to a rotor 22 rotational speed of 50 rpm. Typically the rotational speed of shaft 22 which will result in the first shift will be between 10-50% of the expected maximum rotational speed, with other shifts provided at higher speeds if desired until the maximum effective gear ratio is provided for the components involved. The increase in effective gear ratio may be incremental (as for gears and sprockets) or substantially continuous (as for cones and associated belts).

Normally at least a third sprocket 69 is also provided (almost any practical number may be provided, for example six or seven rear sprockets are used in a LandRider bicycle). The transmission 67 wilt automatically shift to the third sprocket 69 at a point where the TSR is at a certain level (e. g. about 0.25) to help maintain the rotor Cp near an optimum value.

While the particular drive 62 and transmission 67 described above provide a simple, reliable, mechanical system, other systems that are more complex and are electromechanical may be used instead. For example, a conventional sensor which generates an electrical signal substantially proportional to speed may be mounted in association with the shaft 26 or any element operatively connected thereto. The electric signal so generated can be used to cause a solenoid, electric motor, hydraulic or pneumatic cylinder, or the like to shift a chain between sprockets, or shift between driven gears driven by a drive gear connected to shaft 26, etc. Any other conventional or hereafter developed mechanism for automatically changing the effective gear ratio between shaft 26 and driven element 61 in response to direct sensing of the speed of rotation of rotor 22 (or an element operatively connected thereto) may alternatively be provided.

Using the drive 62 and transmission 67 according to the invention, it is possible to—without directly sensing wind speed (which may be highly variable and change too quickly)—change the resistance of a driven element connected to a Savonius rotor shaft in a manner proportional to wind speed. A Savonius rotor has high torque, but traditionally does not have high rotational speed, which is why it has not been in widespread use for generating electricity. However by increasing the gear ratio in response to the rotational speed of a Savonius rotor, and in a relatively simple manner, high generator output may be reached when the wind speed is high without stalling the Savonius rotor at low wind speed.

Figure 7:
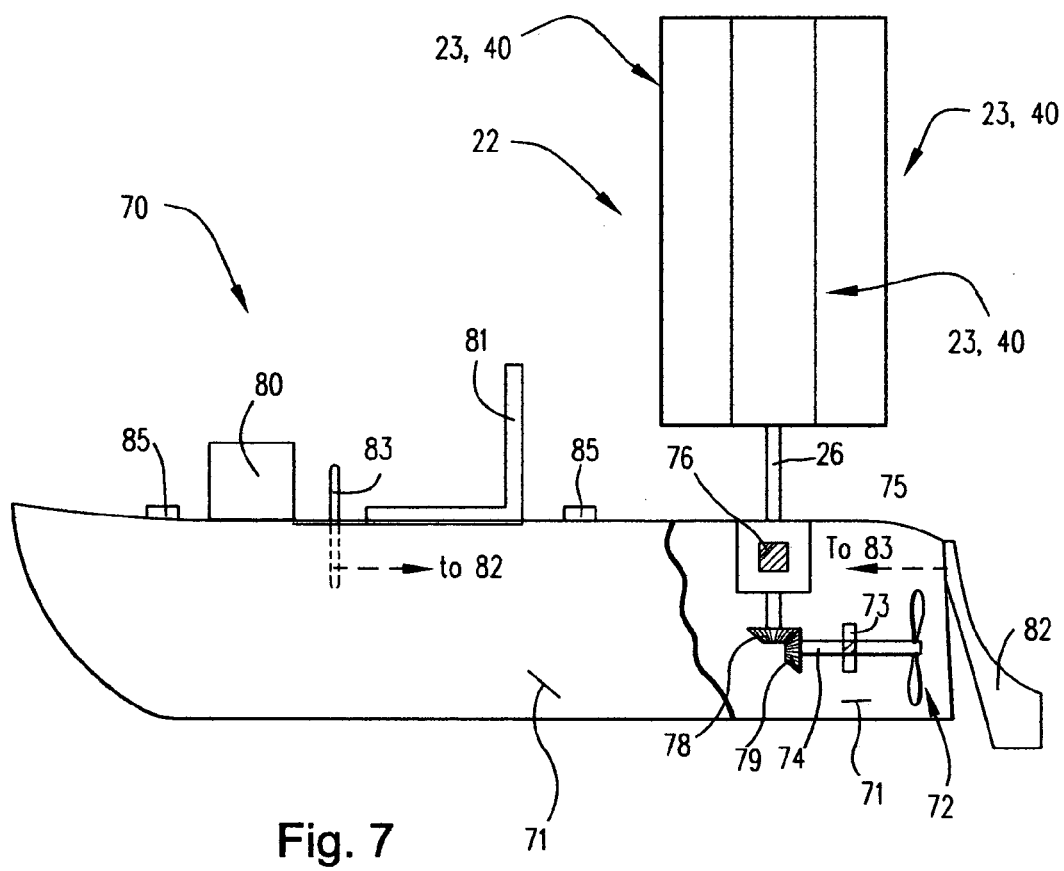
FIG. 7 is a schematic side elevational view, with portions cut away, of a catamaran utilizing the Savonius rotor of FIG. 5.

FIG. 7 illustrates a wind powered boat 70 according to the present invention, using essentially the same rotor 22 as the rotor in FIGS. 4 & 5. The wind powered boat 70 comprises: A plurality of hulls 71 (the boat 70 is preferably a catamaran, trimaran, or other multi-hull). A propulsion mechanism—such as horizontal axis propeller 72—operatively connected (e. g. by support 73 and shaft 74) to at least one of the hulls 71 and between two of the hulls 71. A Savonius vertical axis wind turbine rotor 22 having an aspect ratio of at least 2:1, and comprising: at least one substantially vertical shaft 26; three blades (formed by ribs 23 and vanes 40) operatively connected to the shaft 26; and the blades 23, 40 having a curvature of greater than about 6:1, and a skew factor of at least about 0.65. And, the rotor 22 is operatively mounted to at least one of the hulls 71 (e. g. by bearing 75 and supports 76) and is also operatively connected to the propulsion mechanism 72, e. g. by meshing bevel gears 78, 79.

The wind powered boat 70—as the boat described in co-pending application Ser. No. 10/443,954—may have a manual assist 80 (such as a bicycle type drive for a propeller), a seat 81, a rudder 82, and a control stick 83 for operating the rudder 82 and operatively connected thereto, as by a lever. The hulls 71 may be connected together by cross pieces 85, and the seat 81 operatively connected to the cross pieces 85. The rotor 22 may be mounted to the rear of the seat 81 or in front of it (in which case the vanes 40 should be of transparent material). Alternatively, multiple rotors 22 and associated propulsion mechanisms 72 may be provided, one or more in front of seat 81, and one or more in back of seat 81.

All numerical values herein are approximate, and all narrow ranges within a broad range are specifically included herein (for example "about 0.75-0.85" includes 0.76-0.856, 0.78-0.84, 0.745-0.80, and all other narrower ranges). While the invention has been herein shown and described in what is presently conceived to be the most practical and preferred embodiment, it is to be understood that many modifications may be made thereof within the scope of the invention, limited only by the prior art, to encompass all equivalents within the scope of the appended claims.

What is claimed is:

1. A Savonius vertical axis wind turbine rotor comprising:
   three blades operatively connected together to form a vertical axis wind turbine rotor; and
   said blades having a curvature of greater than about 7:1, and a skew factor of greater than about 0.6.

2. A Savonius rotor as recited in claim 1 further comprising at least one substantially vertical shaft, said blades operatively connected to said shaft and extending radially outwardly; and wherein said rotor has an aspect ratio of at least about 2:1.

3. A Savonius rotor as recited in claim 1 wherein said blades have a skew factor of about 0.78-0.9.

4. A Savonius rotor as recited in claim 1 wherein said blades have a curvature of about 2:1 to 2.5:1.

5. A Savonius rotor as recited in claim 1 wherein the blades comprise a plurality of spokes axially spaced along the at least one shaft, each spoke comprising three generally radially extending ribs arcuately spaced from each other approximately 120 degrees; and wherein the blades further comprise vanes of sheet material operatively connected to the ribs.

6. A Savonius rotor as recited in claim 5 wherein the vanes are substantially straight vertically, substantially devoid of twist, and the spokes are substantially vertically aligned.

7. A Savonius rotor as recited in claim 5 wherein the rotor has a Cp at least about twice that of an otherwise identical rotor with a skew factor of 0.5 or below.

8. A Savonius rotor as recited in claim 2 wherein said rotor has an aspect ratio of at least about 2:1; wherein said blades have a skew factor of about 0.75-0.9; said blades have a curvature of about 2:1 to 5.5:1; wherein the blades comprise a plurality of spokes axially spaced along the at least one shaft, each spoke comprising three generally radially extending ribs arcuately spaced from each other approximately 120 degrees; wherein the blades further comprise vanes of sheet material operatively connected to the ribs; wherein the vanes are substantially straight vertically, substantially devoid of twist, and the spokes are substantially vertically aligned; and wherein the rotor has a maximum power coefficient at least about twice that of an otherwise identical rotor with a skew factor of 0.5 or below.

9. A Savonius rotor as recited in claim 1 wherein the rotor has a maximum power coefficient at least about twice that of an otherwise identical rotor with a skew factor of 0.5 or below.

10. A Savonius rotor as recited in claim 2 wherein the blades comprise a plurality of spokes axially spaced along the at least one shaft and arcuately spaced from each other approximately 120 degrees, each spoke comprising three generally radially extending ribs; and wherein the blades further comprise vanes of sheet material operatively connected to the ribs.

11. A Savonius rotor as recited in claim 10 wherein the vanes are substantially straight vertically, substantially devoid of twist, and the spokes are substantially vertically aligned.

12. A Savonius rotor as recited in claim 10 wherein the rotor comprises a single shaft, and wherein each spoke comprises a hub surrounding the shaft and operatively connected thereto to substantially preclude movement with respect to the shaft, the ribs extending generally radially outwardly from the hub.

13. A Savonius rotor as recited in claim 12 wherein each blade has a skew factor of about 0.75-0.85 and a curvature of between about 2.5:1 to 5:1.

14. A Savonius rotor as recited in claim 1 in combination with a driven element and a drive operatively connecting the driven element to the rotor; the drive automatically increasing the effective gear ratio as the speed of rotation of the rotor increases.

15. The combination of claim 14 wherein the drive comprises a first sprocket operatively connected to the at least one shaft, and different size at least second and third sprockets smaller than the first sprocket and operatively connected to the driven element; a chain operatively connecting the first sprocket and the at least second or third sprocket; and a transmission comprising a centrifugal force responsive derailleur for automatically shifting the chain between the at least second and third sprockets.

16. A blade for a Savonius turbine rotor, comprising a plurality of substantially rigid ribs spaced from each other along a first axis and substantially in alignment with each other along that axis; and a vane of sheet material extending between said ribs and operatively connected thereto; and wherein said blade has a curvature of greater than about 7:1, and a skew factor of at least about 0.7; and wherein said blade has an aspect ratio of at least about 4:1.

17. A blade for a Savonius rotor as recited in claim 16 wherein said blade has a skew factor of about 0.75-0.9 and a curvature of about 4:1 or greater.

18. A wind powered boat comprising:
  a plurality of hulls;
  a propulsion mechanism operatively connected to at least one of said hulls and between two of said hulls;
  a Savonius vertical axis wind turbine rotor having an aspect ratio of at least about 2:1, and comprising: at least one substantially vertical shaft; three blades operatively connected to said shaft; and said blades having a curvature of greater than about 6:1, and a skew factor of at least about 0.65; and
  said rotor operatively mounted to at least one of said hulls and operatively connected to said propulsion mechanism.

19. A spoke for a Savonius vertical axis wind turbine rotor comprising:
  a hub with a substantially central through-extending opening and a plurality of substantially rigid at least partially curved ribs extending substantially radially outwardly therefrom, said ribs each having a curvature of greater than about 7:1, and a skew factor of at least about 0.7.

20. A spoke as recited in claim 19 wherein said plurality of ribs comprises three ribs, and wherein each of said ribs has a skew factor of about 0.75-0.9 and a curvature of about 5:1 or greater.

21. A spoke as recited in claim 19 wherein said plurality of ribs comprises three ribs, and wherein each of said ribs has a skew factor of about 0.78-0.9 and a curvature of about 2:1 to 2.5:1.

* * * * *